UNITED STATES PATENT OFFICE.

MARY LOUISE McLAUGHLIN, OF CINCINNATI, OHIO.

METHOD OF DECORATING POTTERY.

SPECIFICATION forming part of Letters Patent No. 526,669, dated September 25, 1894.

Application filed January 26, 1894. Serial No. 498,158. (No specimens.)

*To all whom it may concern:*

Be it known that I, MARY LOUISE MC-LAUGHLIN, a citizen of the United States, residing at Cincinnati, in the county of Hamilton and State of Ohio, have invented a new Method of Decorating Pottery; and I do hereby declare that the following is a full, clear, and exact description of the invention, which will enable others skilled in the art to which it appertains to use the same.

The invention consists in a reversal of the usual process of decorating pottery. In this case the decoration to appear on the surface of the ware, is first applied to the inner surface of the mold. It must, therefore, be painted in reverse. The touches which are to appear upon the outside of the finished ware must be laid first, immediately upon the inner surface of the mold. This decoration is to be applied with diluted clay, technically called "slip," or with "slip" colored with mineral colors. This composition so applied will soon become dried by the absorption of the mold, and may be moistened by spraying or by the application of a wet sponge. The vase, or other article to be molded is then formed by pouring clay in a liquid state into the mold. After the mold has absorbed sufficient moisture from the liquid clay to cause a deposit of the thickness desired upon the inner surface of the mold, the surplus liquid is poured out and the vase or other object which has been formed is left to dry. Upon its removal from the mold, the decoration which had previously been applied to the inner surface of the mold will be found to have become incorporated in the body of the ware.

Having fully described my invention, what I claim, and desire to secure by Letters Patent, is—

The process of applying decorations to pottery in the manner described in the foregoing specification, viz: the application of decorations of clay or of clay mixed with mineral colors to the inner surface of the mold, in order to produce, after casting, an inlay of clay in the body of the ware.

MARY LOUISE McLAUGHLIN.

Witnesses:
CAROLINE R. GAITHER,
ALICE McLEAN.